United States Patent
Gullette et al.

(10) Patent No.: US 11,644,062 B2
(45) Date of Patent: May 9, 2023

(54) ANCHORING SYSTEM FOR ATTACHING EQUIPMENT TO A BUILDING FOUNDATION

(71) Applicant: Siemens Medical Solutions USA, Inc., Malvern, PA (US)

(72) Inventors: Nicholas Gullette, Knoxville, TN (US); Jon Armitage, Knoxville, TN (US); Christopher McBryde, Knoxville, TN (US); Keith Gerlach, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 417 days.

(21) Appl. No.: 16/949,054

(22) Filed: Oct. 12, 2020

(65) Prior Publication Data

US 2022/0112917 A1    Apr. 14, 2022

(51) Int. Cl.
*F16B 43/00* (2006.01)
*F16B 33/02* (2006.01)

(52) U.S. Cl.
CPC .............. *F16B 43/00* (2013.01); *F16B 33/02* (2013.01)

(58) Field of Classification Search
CPC .......... F16B 31/02; F16B 33/00; F16B 33/02; F16B 39/10; F16B 39/24; F16B 43/00
USPC ............................................... 411/371.2, 372
See application file for complete search history.

(56) References Cited

U.S. PATENT DOCUMENTS

| | | | |
|---|---|---|---|
| 2,092,341 A | 9/1937 | Vries | |
| 2,930,199 A | 3/1960 | Jarund | |
| 4,652,193 A | 3/1987 | Hibbs | |
| 4,712,955 A * | 12/1987 | Reece | F16B 37/12 411/17 |
| 4,836,729 A | 6/1989 | Bisping et al. | |
| 4,840,524 A | 6/1989 | Bisping et al. | |
| 5,263,804 A | 11/1993 | Ernst et al. | |
| 5,344,268 A | 9/1994 | Fischer | |
| 5,562,377 A | 10/1996 | Giannuzzi et al. | |
| 5,568,711 A | 10/1996 | Popp et al. | |
| 5,725,342 A * | 3/1998 | Gehrer | F16B 13/124 411/33 |
| 5,730,557 A | 3/1998 | Skupien et al. | |

(Continued)

OTHER PUBLICATIONS

Hilti Inc, printout of web page entitled "Int thrd inserts HIT-IC 1/2" x 2" #47947", web address: https://www.hilti.com/c/CLS_FASTENER_7135/CLS_ANCHOR_RODS_ELEMENTS_7135/r6246?CHA_GLOBAL_ANC_SIZE=1%2F2%20in&CHD_ANCHOR_LENGTH=1-31%2F32%20in&combo_content=a5df3e606a5fb80abef583172770794b&itemCode=47947, Hilti Inc. 2020.

(Continued)

*Primary Examiner* — Roberta S Delisle

(57) ABSTRACT

An anchoring system for attaching equipment to a building foundation. The system includes an insert attached to the foundation by an adhesive, wherein the insert includes a flange that is positioned on a top surface of the foundation. The system also includes a washer element having a recessed portion for receiving the flange, wherein the washer also contacts the top surface. In addition, the system includes a rod element having a reference element, wherein the rod element is threadably engaged with the insert and the washer and wherein when the reference element is aligned with a reference plane indicative of level equipment, the washer is tightened against the top surface to preload the rod element to minimize deflection of the equipment.

20 Claims, 4 Drawing Sheets

(56) References Cited

U.S. PATENT DOCUMENTS

| | | | |
|---|---|---|---|
| 5,731,366 A | 3/1998 | Moench et al. | |
| 5,779,410 A * | 7/1998 | Lautenschlager | F16B 33/02 411/33 |
| 5,807,051 A | 9/1998 | Heminger | |
| 5,961,266 A * | 10/1999 | Tseng | F16B 37/12 411/289 |
| 6,350,093 B1 * | 2/2002 | Petersen | E01B 9/10 411/930 |
| 6,393,795 B1 | 5/2002 | Irwin et al. | |
| 6,402,434 B1 | 6/2002 | Surjan et al. | |
| 8,128,328 B2 | 3/2012 | Ginter | |
| 8,517,641 B2 | 8/2013 | Dubon et al. | |
| 8,585,335 B2 * | 11/2013 | Carbonelli | F16B 13/144 52/704 |
| 8,870,506 B2 * | 10/2014 | Hensley | E04B 1/6803 52/396.05 |
| 9,273,714 B2 * | 3/2016 | Jackson | E01D 19/103 |
| 2007/0009341 A1 * | 1/2007 | Nagayama | B21K 1/56 411/176 |
| 2009/0016813 A1 | 1/2009 | Gonzalez et al. | |
| 2010/0124472 A1 * | 5/2010 | Nguyen | H01R 43/002 411/337 |
| 2011/0236153 A1 * | 9/2011 | Kuenkel | F16B 35/041 411/7 |
| 2020/0386258 A1 * | 12/2020 | Size, Jr. | F16B 33/002 |

OTHER PUBLICATIONS

Hilti Inc, printout of web page entitled "Capsule Adhesive Anchors", web address: https://www.hilti.com/c/CLS_FASTENER_7135/CLS_CAPSULE_ADHESIVE_ANCHORS_7135, Hilti Inc. 2020.

Proventure Anchoring Technology, printout of web page entitled "Internally Threaded Insert", web address: https://www.proventure.co.uk/products/chemical-anchors/internally-threaded-insert/#demoTab2, Proventure Anchoring Technology 2020.

Vorpa Anchors and Fixings, "chemical anchors Vorpa CVB-CVD Steel internal threaded sleeve", VorpaTechnical Data download web address https://www.vorpa.com/en/cat0_13541_23076/chemical-anchors/chemical-accessories/p419842-zincplated-sleeves-intemal-thread.php, Vorpa, Jul. 2020.

Powers Fasteners, Product Information, "Internally Threaded Insert", 2010, pp. 1, 9 and 13, Powers Fasteners, Inc., Brewster, NY.

* cited by examiner

ANCHORING SYSTEM FOR ATTACHING EQUIPMENT TO A BUILDING FOUNDATION

TECHNICAL FIELD

Aspects of the present invention relate to an anchoring system for attaching equipment to a building foundation, and more particularly, to an anchoring system having an insert attached to the foundation by an adhesive, wherein the insert includes a flange positioned on a top surface of the foundation and wherein the system also includes a washer and a rod that is threadably engaged with the insert and washer wherein when the washer is tightened against the top surface, the rod is preloaded to minimize deflection of the equipment.

BACKGROUND

Medical imaging systems, such as positron emission tomography (PET) imaging systems, utilize a patient handling system (PHS) that moves a patient through a bore of a gantry of the imaging system. Referring to FIG. 1, an exemplary imaging system 10 is shown having a gantry 12 and a PHS 14 that includes a patient pallet 16 for moving a patient. In use, the PHS 14 moves the patient bed 16 in a horizontal direction along a longitudinal axis 18 through a bore 20 of the gantry 12 and through a field of view 22 of the imaging system 10 that extends along the longitudinal axis 18 wherein the patient is scanned. A straight-line performance of the PHS 14 refers to the travel path of a PHS patient pallet tip 24 as the PHS 14 moves along its horizontal stroke in the field of view 22. It is desirable that the patient pallet 16 move in an accurate straight-line in order to provide optimal image quality. However, due to mechanical tolerances, mechanical deflection and other factors, errors occur that directly affect the straight-line performance and thus the co-registration and image quality provided by the imaging system 10. An area of the PHS 14 design that contributes to such errors is the building foundation or method used to mount or anchor the imaging system to the building foundation.

Recent advancements in PET detector technology and market demand for a longer bore length 15 have led to stricter straight-line performance requirements for the PHS 14. It is desirable to provide a mounting design for a PHS 14 that provides sufficient deflection performance and stiffness to meet the stricter PHS requirements. It is also desirable to provide a manufacturing or installation process for the PHS 14 that reduces the likelihood of error by an installer so to as enhance the consistency of straight-line performance of the PHS 14. In addition, it is desirable to provide an enhanced mounting adjustment or resolution capability for the PHS 14 in order to facilitate meeting the stricter straight-line PHS performance requirements. Further, it is desirable to provide the ability to adjust the position of a PHS 14, without completely reinstalling the PHS 14, to compensate for building foundation movement or other factors that occur over the lifetime of an imaging system 10 which in turn degrade straight-line performance of the PHS 14.

Referring to FIG. 2, a portion of a conventional mounting configuration for the imaging system 10 is shown. In this configuration, internal/female screw threads 26 are formed or cast in a concrete building foundation 28 that is approximately 4.5 in. thick. The material used to cast the internal threads 26 is a chemical anchor configured as an epoxy-based adhesive. Further, the mold used to form the internal threads 26 is a Teflon coated, external/male thread form.

In an alternate mounting solution for the imaging system 10, steel seismic plates are used to mount the imaging system 10 to the building foundation. In this configuration, large, precisely machined, steel foundation plates are both mechanically secured and adhered (using typical concrete grout) to a typical concrete building foundation. However, this mounting solution significantly increases cost and labor. Additionally, removal of the plates is difficult and expensive if it is desired to reorient or reposition the imaging system 10 in the same room.

SUMMARY OF THE INVENTION

An anchoring system for attaching equipment to a building foundation is disclosed. The system includes an insert attached to the foundation by an adhesive, wherein the insert includes a flange that is positioned on a top surface of the foundation. The system also includes a washer element having a recessed portion for receiving the flange, wherein the washer also contacts the top surface. In addition, the system includes a rod element having a reference element, wherein the rod element is threadably engaged with the insert and the washer and wherein when the washer is tightened against the top surface, the rod element is preloaded to minimize deflection of the equipment.

Those skilled in the art may apply the respective features of the present invention jointly or severally in any combination or sub-combination.

BRIEF DESCRIPTION OF THE DRAWINGS

The exemplary embodiments of the invention are further described in the following detailed description in conjunction with the accompanying drawings, in which.

DETAILED DESCRIPTION

Figure 1:
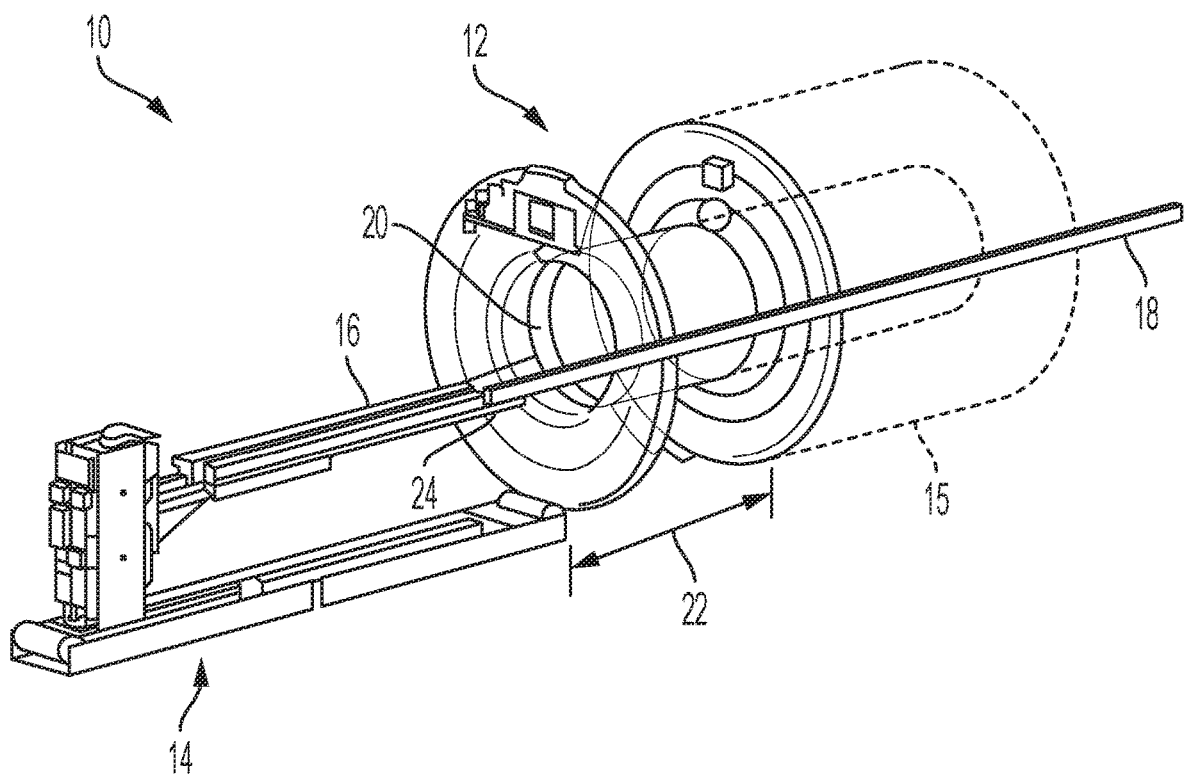
FIG. 1 shows an exemplary imaging system having a gantry and a patient handling system (PHS) that includes a patient pallet for moving a patient.
Figure 2:
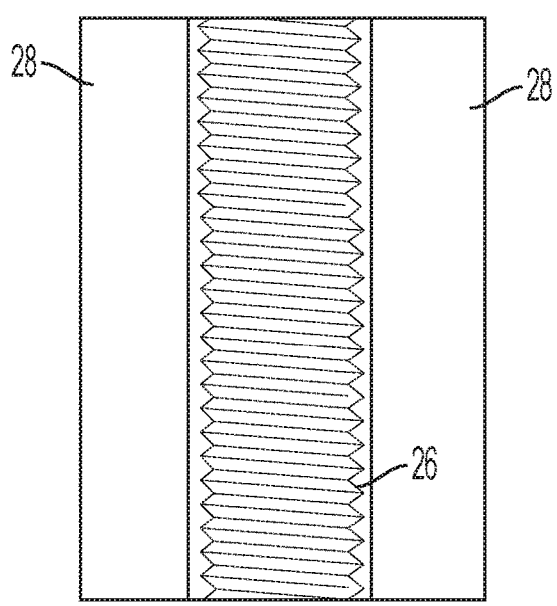
FIG. 2 shows a portion of a conventional mounting configuration for an imaging system.

Although various embodiments that incorporate the teachings of the present disclosure have been shown and described in detail herein, those skilled in the art can readily devise many other varied embodiments that still incorporate these teachings. The scope of the disclosure is not limited in its application to the exemplary embodiment details of construction and the arrangement of components set forth in the description or illustrated in the drawings. The disclosure encompasses other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Figure 3:
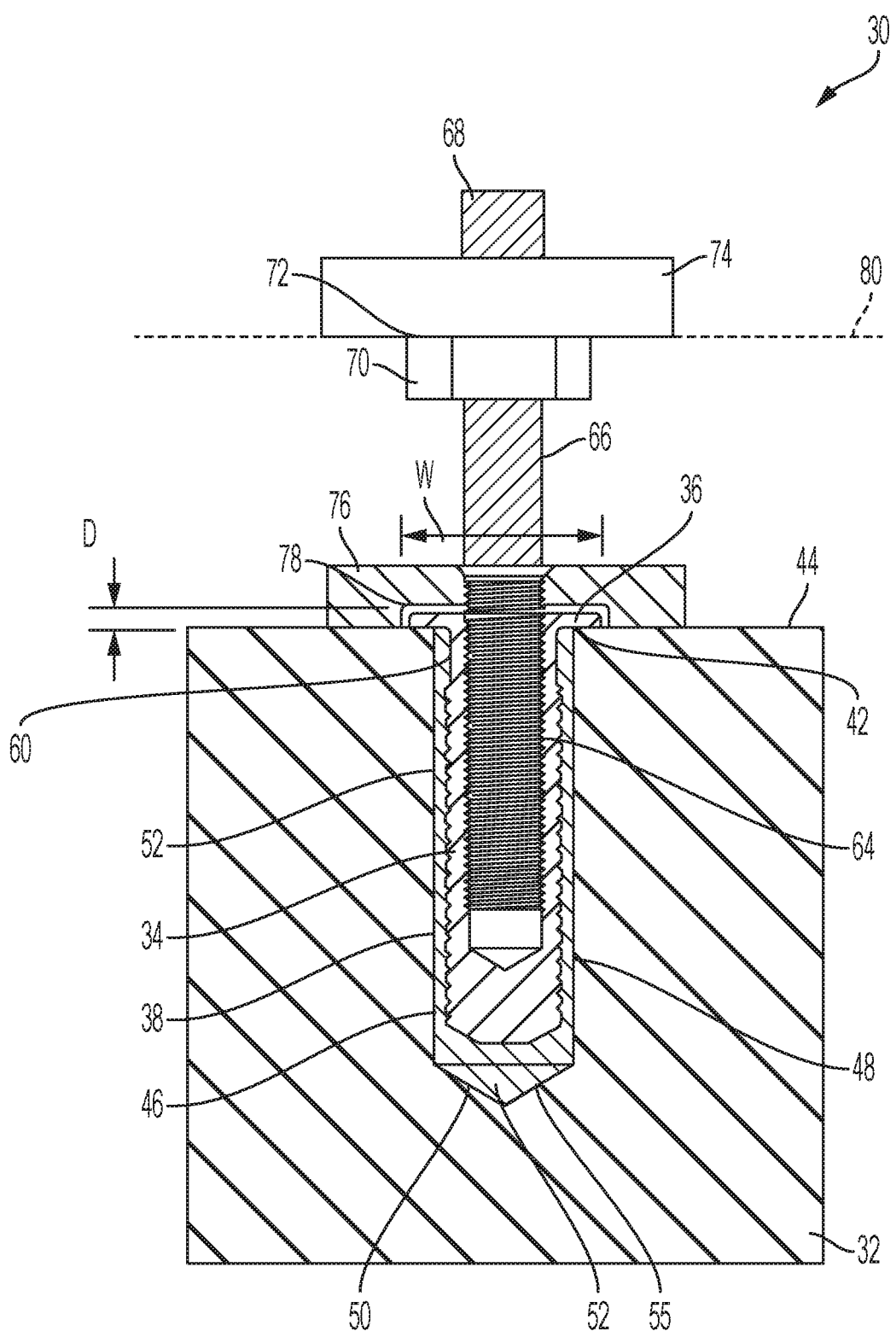
FIG. 3 depicts an anchoring system in accordance with the invention for attaching equipment to a building foundation.
Figure 4:
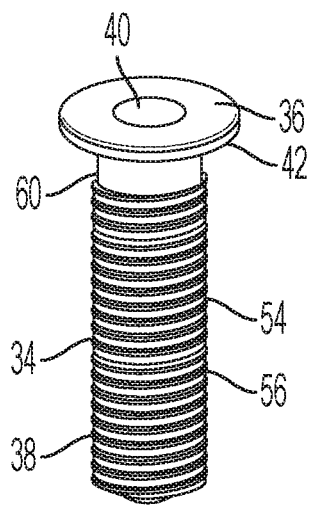
FIG. 4 is a perspective view of an insert of the anchoring system.

Referring to FIG. 3, an anchoring system 30 in accordance with the invention is shown for attaching a medical imaging system 10 (see FIG. 1), such as a PET imaging system, to a building foundation 32. Further, the anchoring system 30 may be used to attach a subsystem, substructure, part, device or combination thereof of the imaging system 10 such as a patient handling system (PHS) 14. Although the invention is described herein in relation to an imaging system 10, the anchoring system 30 may also be used to attach any equipment, structure, system, machinery or other apparatus that is typically attached to a concrete building foundation. In accordance with an aspect of the invention, a plurality of anchoring systems may be used to level and attach the PHS 14 to the foundation 32. For example, two rows of 17 anchoring systems each may be used to attach the PHS 14 to the foundation 32. Referring to FIG. 4, a perspective view of an insert 34 of the anchoring system 30 is shown. Referring to FIGS. 3 and 4, the insert 34 includes a flange portion 36 and a downwardly extending receiver portion 38 having an opening 40. A bottom surface 42 of the flange 36 contacts a top surface 44 of the foundation 32. The receiver portion 38 extends into a hole 46 defined by a sidewall 48 and first 50 and second 55 bottom walls formed in the foundation 32. In an embodiment, a drill depth for forming the hole 46 may be approximately 2.75 in. A known chemical anchor such as a concrete anchor adhesive 52 is used to attach an outer surface 54 of the receiver portion 38 to the sidewall 48 and first 50 and second 55 bottom walls. For example, a concrete anchor adhesive such as DeWalt AC100+ Gold® vinylester adhesive anchoring system, DeWalt AC200+™ Gold adhesive anchoring system, Simpson AT-XP® acrylic anchoring adhesive or Red Head A7+ adhesive system may be used. It is understood that other concrete anchor adhesives may be used having a suitable high load carrying capability.

In another aspect of the invention, the external surface 54 of the receiver portion 38 may include a helical rib 56 that forms an interface region between the insert 34 and the concrete anchor adhesive 52 to form a locking rib 56 that provides a mechanical and adhesive bond along substantially the entire length of the insert 34. The external surface 54 may also include a groove 60 adjacent the flange 36 to form a locking ring 60 that provides a region of concrete anchor adhesive 52 having a substantially larger shear area than that provided by the helical interface region. This creates a substantially robust ridge that the locking rib 56 must defeat in order for the anchoring system 30 to fail. The locking rib 56 and locking ring 60 each form a mechanical bond in addition to the adhesive bond provided by the concrete anchor adhesive 52. Alternatively, the external surface 54 may only include a standalone locking rib 56 or a standalone locking ring 60. It has been determined by the inventors herein that the highest distribution of tensile load transferred from the imaging system 10 to the foundation 32 is located near the top surface 44 of the foundation 32. In accordance with an aspect of the invention, the locking ring 60 is located near the top surface 44 of the foundation 32. Thus, the most robust locking feature (i.e. the locking ring 60) is located in the region of the highest expected load/force.

The opening 40 of receiver portion 38 includes an internal thread 64 that mates with the external thread 66 of a threaded element, such as a threaded rod or jackscrew 68 having a reference element 70. The reference element 70 may be affixed to the jackscrew 68 to form a one-piece configuration. Alternatively, the reference element 70 may be rotatable relative to the jackscrew 68. In an embodiment, the reference element 70 may be hex shaped. A reference top surface 72 of the reference element 70 contacts a base section 74 of the imaging system 10 or other equipment to be attached to the foundation 32 to support the imaging system 10 or the other equipment. In accordance with an aspect of the invention, the flange 36 serves as a load bearing flange that transfers all compressive loads (i.e. downward loads) directly to the foundation 32 and not to the concrete anchor adhesive 52 as in conventional systems, thus eliminating the concrete anchor adhesive 52 from the load path. This maximizes the stiffness of the anchoring system 30 and minimizes the deflection of imaging system 10 due to loads in the downward direction. In another aspect of the invention, the flange 36 also serves as an installation aid that simplifies installation and/or manufacturing of the anchoring system 30 and provides more repeatable performance. In particular, the flange 36 enables control of the insertion depth of the insert 34. Further, the flange 36 directs excess concrete anchor adhesive 52, which is pumped out of the hole 46 during installation, away from the internal thread 64 of the anchoring system 30. This is an advantage since the concrete anchor adhesive 52 may damage the internal thread 64 thus necessitating repair and/or rework.

The anchoring system 30 further includes a locking and preload washer 76 that includes a recessed portion 78 having a depth D and width W sized to receive the flange 36 such that the washer 76 contacts the top surface 44 of the foundation 32. The jackscrew 68 is also threadably engaged with the washer 76. Both the washer 76 and insert 34 may be fabricated from high strength steel such as American Iron and Steel Institute (AISI) 1045 steel per American Society for Testing and Materials (ASTM) standard A194-2H.

Figure 5:
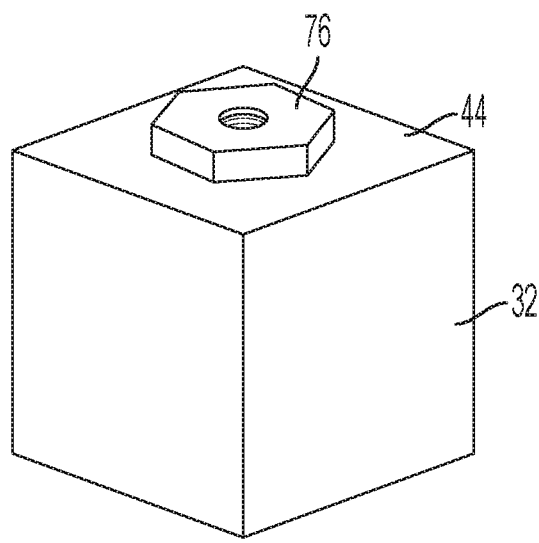
FIG. 5 is a perspective view of a washer of the anchoring system and the building foundation.

Prior to attaching the imaging system 10 to the foundation, an imaging system reference plane 80 is determined by a known process for leveling the imaging system 10 that uses a gage block and precision levels. After the reference plane 80 is determined, the jackscrew 68 is rotated relative to the insert 34 to raise or lower the reference element 70 as needed until the reference top surface 72 is aligned with the reference plane 80. The washer 76 is then tightened against the foundation top surface 44 to stop rotation of the jackscrew 68, thus locking the jackscrew 68 in place with the reference top surface 72 aligned with the reference plane 80. The process of aligning a reference top surface 72 with the reference plane 80 and tightening the corresponding washer 76 is then repeated for adjacent anchoring systems. A fastener such as a hex nut is then threaded onto a top portion of the jackscrew 68 and tightened against the imaging system 10 to attach the imaging system 10. Referring to FIG. 5, a perspective view of the washer 76 and foundation 32 is shown. The washer 76 may have a hexagonal shape to facilitate tightening of the washer 76 with an appropriate tool. Alternatively, the washer 76 may include spaced-apart holes for receiving pins extending from a spanner tool used to tighten the washer 76.

In a further aspect of the invention, tightening of the washer 76, in conjunction with the concrete anchor adhesive 52 and the threadable engagement between the jackscrew 68 and internal thread 64, causes the jackscrew 68 to be stretched to a desired force and becomes preloaded. In accordance with an aspect of the invention, the shape, thickness and material used to fabricate the washer 76 are selected to provide a suitable stiffness for providing a desired preload on the jackscrew 68. Preloading of the jackscrew 68 minimizes deflection of the anchoring system 30 and imaging system 10 when subjected to tensile loads such as loads upward out of the foundation 32. In addition, preloading of the jackscrew 68 minimizes cyclical loading that occurs during operation of the imaging system 10 which often leads to joint/adhesive failure. Further, the washer 76 also transfers compressive loads (i.e. downward into the foundation 32) directly to the foundation 32.

Figure 6:
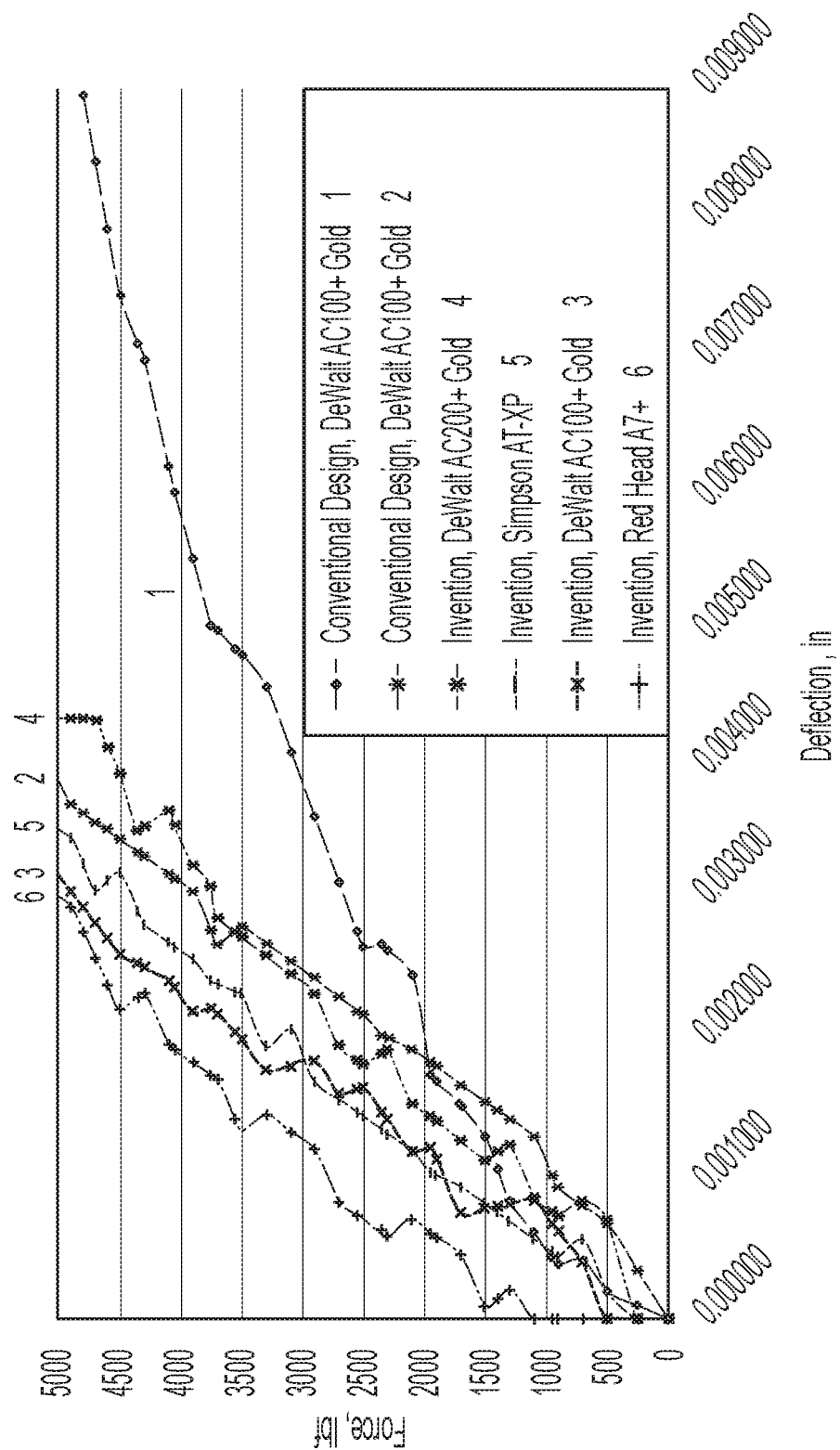
FIG. 6 depicts tensile stress-strain curves for conventional anchoring systems and anchoring systems in accordance with the invention.

Referring to FIG. 6, tensile stress-strain curves are shown for conventional anchoring systems and anchoring systems of the invention. The invention disclosed herein advantageously provides a high load carrying and low deflection capability, such as, for example, greater than approximately 6,000 lbf and less than approximately 0.005 in. In addition, the invention is optimized for use with approximately 4.5-inch-thick C20/C25 concrete although it is understood that other concrete formulations, substrates and/or thicknesses may be used. For example, the invention may be implemented by using a relatively shallow drill depth (i.e. approximately 2.75 in.) thus enabling installation in substrates with a thickness of less than 4.5 in. Additionally, having a relatively shallow drill depth facilitates installation since drilling time is minimized and the likelihood of hitting obstacles such as reinforcing bar (i.e. rebar) that may be present in the concrete is reduced.

In yet another aspect of the invention, the internal thread 64 of the insert 34 is configured as a fine internal pitch thread. This provides substantially improved resolution than that available in conventional mounting arrangements wherein the internal thread is cast in an epoxy-based adhesive. In an embodiment, the internal thread 64 of the insert 34 may have a ½-20 Unified National Fine (UNF) thread. In particular, use of a fine thread enables sufficient adjustment resolution that allows for more accurate and repeatable initial installations. Further, use of a fine thread allows the same resolution for readjustments that may be needed over a system lifetime. Moreover, the metal thread 64 of the insert 34, regardless of the thread type and/or pitch, provides a thread interface that is sufficiently robust over time and still allows re-adjustments years later, which is in contrast to the epoxy thread used in the previously described conventional anchoring systems. In particular, adjustments for straight-line performance may be performed by a partial re-installation of the imaging system 10 using a known jackscrew leveling procedure. Alternatively, the invention enables in-place adjustments of the imaging system 10 (i.e. no re-installation required).

The invention significantly reduces service cost and time for imaging systems experiencing a degradation in straight-line accuracy as compared to anchoring systems that use cast threads. In addition, the invention provides enhanced nominal and lifetime straight-line performance. Further, the invention eliminates the use of backup screens and coated rods and the brushing/cleaning of epoxy threads after forming is not required.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

We claim:

1. An anchoring system for attaching equipment to a building foundation, comprising:
    an insert attached to the foundation by an adhesive, wherein the insert includes a flange that is positioned on a top surface of the foundation;
    a washer element located over the flange, wherein the washer also contacts the top surface; and
    a rod element having a reference element, wherein the rod element is threadably engaged with the insert and the washer and wherein when the washer is tightened against the top surface, the rod element is preloaded to minimize deflection of the equipment.

2. The system according to claim 1, wherein the insert includes a receiver portion having an internal thread and the rod element is threadably engaged with the internal thread.

3. The system according to claim 2, wherein the internal thread is a fine internal pitch thread.

4. The system according to claim 2, wherein the receiver portion includes a locking ring that provides a region of adhesive.

5. The system according to claim 1, wherein the adhesive is a concrete anchor adhesive.

6. The system according to claim 1, wherein the washer includes a recessed portion having a depth and width sized to receive the flange.

7. An anchoring system for attaching an imaging system to a building foundation, comprising:
    an insert attached to the foundation by an adhesive, wherein the insert includes a receiver portion that extends into the foundation and a flange that is positioned on a top surface of the foundation;
    a washer element having a recessed portion for receiving the flange, wherein the washer also contacts the top surface; and
    a rod element having a reference element, wherein the rod element is threadably engaged with the receiver portion and the washer and wherein when the washer is tightened against the top surface, the rod element is preloaded to minimize deflection of the imaging system.

8. The system according to claim 7, wherein the receiver portion includes an internal thread and the rod element is threadably engaged with the internal thread.

9. The system according to claim 8, wherein the internal thread is a fine internal pitch thread.

10. The system according to claim 7, wherein the receiver portion includes a locking ring that provides a region of adhesive.

11. The system according to claim 7, wherein the adhesive is a concrete anchor adhesive.

12. The system according to claim 7, wherein the recessed portion has a depth and width sized to receive the flange.

13. An anchoring system for attaching an imaging system to a building foundation, comprising:
    an insert attached to the foundation by a concrete anchor adhesive, wherein the insert includes a receiver portion that extends into the foundation and a flange that is positioned on a top surface of the foundation wherein the flange serves as a load bearing flange that transfers all compressive loads directly to the foundation;
    a washer element having a recessed portion for receiving the flange, wherein the washer also contacts the top surface; and
    a rod element having a reference element, wherein the rod element is threadably engaged with the receiver portion and the washer and wherein when the reference element is aligned with a reference plane indicative of a level imaging system, the washer is tightened against the top surface to preload the rod element to minimize deflection of the anchoring system and imaging system when subjected to tensile loads upward out of the foundation.

14. The system according to claim 13, wherein the receiver portion includes an internal thread and the rod element is threadably engaged with the internal thread.

15. The system according to claim 14, wherein the internal thread is a fine internal pitch thread.

16. The system according to claim 15, wherein the thread is a ½-20 Unified National Fine (UNF) thread.

17. The system according to claim 13, wherein the recessed portion has a depth and width sized to receive the flange.

18. The system according to claim 13, wherein the washer is hex shaped.

19. The system according to claim 13, wherein an external surface of the receiver portion includes a groove for providing a region of adhesive.

20. The system according to claim 13, wherein an external surface of the receiver portion includes a helical rib that forms an interface region between the external surface and the concrete anchor adhesive.

\* \* \* \* \*